Figure 1:
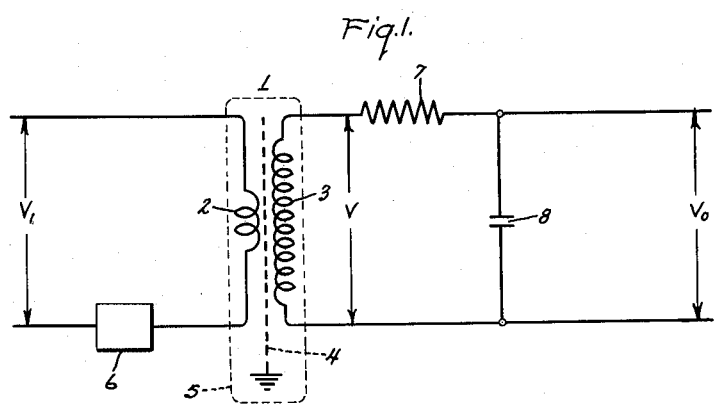

April 3, 1962  F. H. WRIGHT  3,028,539
CURRENT TRANSFORMER
Original Filed July 12, 1956

Inventor:
Floyd H. Wright,
by (signature)
His Attorney.

United States Patent Office 3,028,539
Patented Apr. 3, 1962

3,028,539
CURRENT TRANSFORMER
Floyd H. Wright, 5126 Archwood Lane, Fort Wayne, Ind.
Continuation of application Ser. No. 597,558, July 12, 1956. This application Jan. 31, 1958, Ser. No. 713,079
2 Claims. (Cl. 323—61)

This invention relates to stationary induction apparatus, and more particularly to current transformers. This application is a continuation of the copending application of Floyd H. Wright, Serial No. 597,558, filed July 12, 1956, now abandoned, for Current Transformer.

It is frequently desirable to measure the alternating current through a particular device, such as an electric motor, without substantially affecting the line voltage across the device since otherwise the measured current will not be truly representative of the current at line voltage. Heretofore, such measurements have been made by means of iron core current transformers; such transformers have been relatively heavy for the intended purpose and have necessitated special switching apparatus to insure that, when the secondary circuit was open, the primary winding was also disconnected. This was necessary because of the very high turns ratio between the primary and secondary windings of conventional current transformers: the voltage across the secondary winding is maintained within reasonable limits when the secondary circuit is completed because the fluxes generated by the primary and secondary windings are in bucking relationship. However, when there is no current in the secondary winding, as is the case when the secondary circuit is open, an exceedingly high voltage then appears across the secondary winding. It is to avoid this high secondary open circuit voltage that the special switching apparatus has been required. It is therefore highly desirable to decrease the weight and amount of material required for a current transformer to effect the desired purpose and further to provide a current transformer which will eliminate any need for the special switching apparatus previously required.

In addition to the problems discussed above, iron core current transformers have often introduced errors into the current readings because the variation of the flux with the variations in the supply frequency was not linear. While corrective integrating circuits have been used in combination with iron core transformers, the high accuracy desirable for many current measuring purposes often could not be obtained because of the difficulty in causing the integrating circuit to provide for the non-linearity in the flux variation. It is, consequently, additionally most desirable to provide a transformer with a non-magnetic core ensuring linear flux response in combination with apparatus which can take advantage of the linear response in order to achieve a given output signal to the measuring apparatus regardless of the frequency of the source of supply.

It is, accordingly, an object of this invention to provide an improved current transformer without any magnetic core, i.e., of the "air core" type. It is a further object of this invention to provide such a transformer in combination with circuitry to insure that the signal to the measuring apparatus will be independent of the supply frequency.

Yet another object of the invention is to provide current measuring means which is accurate and lighter than previously used current transformers of the iron core type with a very small line voltage drop compared to previously used structures.

In one aspect thereof, the invention provides an air core current transformer with a primary winding consisting of a relatively very small number of turns of thick conductor and a secondary winding consisting of a relatively very high number of turns of fine wire. A grounded electrostatic shield is positioned between the windings to avoid capacitive coupling thereof, and the windings are positioned to be linked by flux passing only through a non-magnetic medium. While the term "air core" transformer is commonly used to described such arrangements, this includes all transformers lacking a magnetic core, such as, for instance, where the windings are encased in a potting compound and the path of the flux is through the compound. The circuit of the invention also includes a resistance in series with the secondary winding and a capacitance thereacross. The resistance and the capacitance are so proportioned as to provide a signal attenuation of approximately six decibels per octave. This attenuation provides a reduction of one half of the output signal relative to the secondary winding voltage each time the input frequency doubles, thereby effecting a constant output signal regardless of variations in the input frequency. This arrangement provides an output signal dependent entirely upon the magnitude of the current through the primary winding so that the measurement of the current is a true one regardless of frequency variations.

The features of the invention which are believed to be novel are set forth with particularity in the appended claims. The invention, itself, however, together with further objects and advantages thereof may best be understood by reference to the following description taken in connection with the accompanying drawing.

Figure 2:
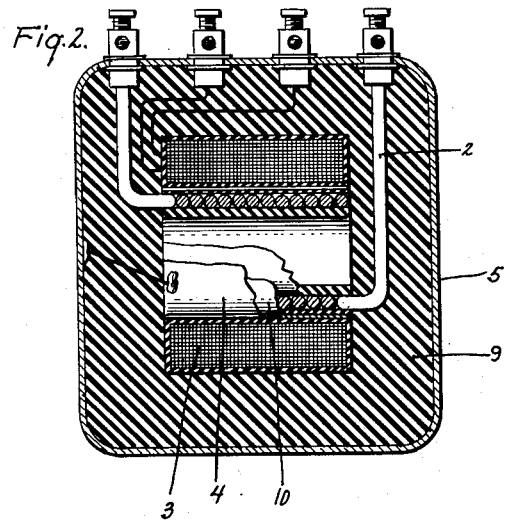

In the drawing,

FIGURE 1 is a schematic diagram of an improved current transformer incorporating the circuitry of the invention; and FIGURE 2 is a view in cross section of the physical arrangement of the transformer.

A transformer of the air core type, generally indicated at 1, is provided with a primary winding 2 having a very small number of turns of a thick conductor, and a secondary winding 3 having a very high number of turns of fine wire. An electrostatic shield 4, grounded to a casing of magnetic material 5, is positioned between windings 2 and 3 so as to preclude any capacitive coupling of the two windings. Shield 4 permits winding 3 to pick up exceedingly small flux densities set up by the primary winding 2. Casing 5 is filled with an insulating compound 9, such as permafil or asphalt, to protect the parts and maintain them in predetermined relation, and suitable insulation 10 is provided in the ordinary manner between the windings.

Winding 2 is in series with an impedance 6 which represents the device through which the current is to be tested. Consequently, primary winding 2 has an exceedingly low impedance compared to device 6 even though, in the case of many motors, for instance, the impedance of device 6 may be only on the order of 1.0 ohm. A source (not shown) of alternating current power provides a voltage drop of V; across winding 2 and device 6. The proportion of the impedance of primary winding 2 to that of device 6 makes the voltage drop across the primary winding in effect negligible insofar as device 6 is concerned; thus, the current passing through primary winding 2 and device 6 is with substantially line voltage across the device.

An integrating circuit consisting of a resistance 7 in series with winding 3 and a capacitance 8 across winding 3 is provided in order to preclude variations in the output signal, or voltage, $V_o$ in response to variations in the frequency of the input voltage $V_i$. Without the integrating circuit of resistance 7 and capacitance 8, secondary winding output voltage V will vary with the variations in the frequency of $V_i$. However, as is well known in the art, where resistance 7 and capacitance 8 are so proportioned as to effect an attenuation of approximately 6 decibels per octave, they change the output signal $V_o$ relative to the uncorrected secondary signal V in inverse proportion to changes in the frequency of $V_i$. This relationship is readily obtained by use of the expression $$R = \frac{1}{2\pi f C}$$

where R is the impedance of resistance 7, C is the impedance of capacitor 8, and $f$ is a frequency considerably smaller than the lowest time frequency, $f_0$ which will occur. $f$ shall normally be no greater than $$\frac{f_0}{2}$$

to ensure a linear attenuation; the lower limit of $f$ is dictated by the size and cost of the components and by the fact that as $f$ decreases so does $V_o$. A value of $$f = \frac{f_0}{4}$$

has been found to be satisfactory both as to linearity of attenuation and as to cost of components and quality of output signal.

Thus, if the frequency of $V_i$ doubles, $V_o$ is halved with respect to V. In a transformer of the "air core" type, the response of V to changes in the frequency of $V_i$ is perfectly linear. Therefore, V will also have doubled with the frequency, and $V_o$ will remain the same thus continuing to represent a true measure of the current through primary winding 2 and device 6.

In order that the invention be better understood, there is set forth below a specific example of a circuit provided in accordance with the invention. It is, however, to be understood that the specific values set forth are not intended to represent limits on the invention but, in their combined relationship to each other, are only intended to provide a suggestion for one practical embodiment of the invention.

In order to test a device 6 consisting of an electric motor having an impedance of approximately 1 ohm, it was placed across a 110 volt, 60 cycle source of power in series with the primary winding 2 of transformer 1. Primary winding 2 was provided with an impedance of .002 ohm which, in effect, causes the voltage drop thereacross to be negligible relative to the voltage across the motor. This low impedance was provided by 10 turns of copper wire having a diameter of 0.125. The secondary winding 3 of the transformer was formed of approximately 15,000 turns of very fine wire (.005 diameter) and was encapsulated together with the primary winding in a potting compound of insulating material. A resistant 7 of 16,000 ohms was provided in series with secondary winding 3 and a capacitance of 0.5 microfarad was placed across the secondary winding (using 60 cycles as the lowest possible line frequency $f_0$, and $$\frac{f_0}{4} = f$$

in the formula $$R = \frac{1}{2\pi f C}$$

Resistance 7 and capacitance 8 together provide the integrating circuit described above so as to effect a linear attenuation of approximately 6 decibels per octave.

With this circuit, an output voltage $V_o$ was provided which varied from approximately 25 volts for a current of 100 amperes through winding 2 down to 1.25 volts for a current of 5 amperes through winding 2. Thus, a signal constantly directly proportional to the current through the winding 2 and the motor of device 6 was provided regardless of possible variations in frequency of the input voltage $V_i$.

The fact that transformer 1 is of the air core type means that the current through the secondary circuit is exceedingly small and there is little difference in the relationship of windings 2 and 3 whether the secondary circuit be open or closed. Consequently, it is not necessary to provide any special interlocking switch mechanism to open the primary winding circuit when the secondary winding circuit is open. This constitutes a definite advantage over the iron core type of current transformer where, unless current was flowing in the secondary circuit, the voltage across the secondary winding became dangerously high. The elimination of the iron core removes weight from the transformer while at the same time making linear responses an actuality.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. An apparatus for measuring the current supplied to an electrical device from an alternating current source at frequencies below 100 cycles per second comprising: a current transformer having a primary winding consisting of a relatively very small number of turns of a relatively thick conductor, a seconding winding consisting of a relatively very high number of turns of fine wire, a casing formed of magnetic material surrounding said windings, an electrostatic shield positioned between said windings and grounded to said casing, said windings being positioned to be linked by flux passing only through a non-magnetic medium, a pair of input connections for connecting said primary winding in series circuit relationship with said electrical device across said alternating current source, and an integrating circuit including a resistor in series with said secondary winding and a capacitor across said secondary winding, said resistor and said capacitor being proportioned to provide a signal attenuation of approximately 6 decibels per octave, and output means connected across said capacitor, the voltage appearing across said output means being directly proportional to current flow through said electrical device and said primary winding.

2. An apparatus for measuring the current supplied to an electrical device from an alternating current source at frequencies below 100 cycles per second comprising: a current transformer including a primary winding having an impedance of a few thousandths of an ohm, a secondary winding consisting of several thousand turns of fine wire, a casing formed of magnetic materials surrounding said windings, an electrostatic shield positioned between said windings and grounded to said casing, said windings being positioned to be linked by flux passing only through a non-magnetic medium, a pair of input connections for connecting said primary winding in series circuit relationship with said electrical device across said alternating current source, an integrating circuit including a resistor in series with said secondary winding and a capacitor across said secondary winding, said integrating means being arranged to provide a signal attenuation of approximately 6 decibels per octave, and output means connected across said capacitor, the voltage appearing across said output means being directly proportional to the current flow through said electrical device and said primary winding.

References Cited in the file of this patent

UNITED STATES PATENTS

| | | |
|---|---|---|
| 2,725,515 | Horton | Nov. 29, 1955 |
| 2,731,589 | Marsh | Jan. 17, 1956 |

FOREIGN PATENTS

| | | |
|---|---|---|
| 479,596 | Great Britain | Feb. 8, 1938 |